United States Patent
Fletcher, Sr.

(10) Patent No.: US 10,945,553 B1
(45) Date of Patent: Mar. 16, 2021

(54) DEVICE AND METHOD FOR MEASURING AND DISPENSING CUSTOMIZABLE AMOUNTS OF MATERIAL

(71) Applicant: Gregory A. Fletcher, Sr., Alexandria, VA (US)

(72) Inventor: Gregory A. Fletcher, Sr., Alexandria, VA (US)

( * ) Notice: Subject to any disclaimer, the term of this patent is extended or adjusted under 35 U.S.C. 154(b) by 0 days.

(21) Appl. No.: 16/593,921

(22) Filed: Oct. 4, 2019

(51) Int. Cl.
*A47J 31/40* (2006.01)
*A24F 47/00* (2020.01)
*A21C 5/02* (2006.01)

(52) U.S. Cl.
CPC .............. *A47J 31/404* (2013.01); *A24F 47/00* (2013.01); *A21C 5/02* (2013.01)

(58) Field of Classification Search
CPC ........... A47J 31/404; A24F 47/00; A21C 5/02
USPC .......................................... 222/325, 386, 390
See application file for complete search history.

(56) References Cited

U.S. PATENT DOCUMENTS

| | | | | |
|---|---|---|---|---|
| 3,064,858 A * | 11/1962 | Ziegler | ............... | G01F 11/18 222/49 |
| 3,210,836 A * | 10/1965 | Johanson | ........... | H05K 13/0491 29/278 |
| 3,844,291 A * | 10/1974 | Moen | ............... | A61B 17/30 606/206 |
| 4,890,535 A * | 1/1990 | Bieber | ............... | F42B 33/0292 141/167 |
| 5,074,311 A * | 12/1991 | Hasson | ............... | A61B 10/0266 600/567 |
| 5,172,700 A * | 12/1992 | Bencini | ................. | A61B 10/06 600/564 |
| 5,318,589 A * | 6/1994 | Lichtman | ............... | A61B 17/29 600/564 |
| 6,063,037 A * | 5/2000 | Mittermeier | ......... | A61B 10/025 600/567 |
| 6,142,955 A * | 11/2000 | Farascioni | ......... | A61B 10/0275 600/562 |
| 6,240,811 B1 * | 6/2001 | Oesterle | ................. | B25B 13/44 81/90.2 |
| 7,014,614 B2 * | 3/2006 | Casula | ............... | A61B 10/0266 600/567 |
| 7,631,787 B1 * | 12/2009 | Lee | ..................... | F42B 33/0207 222/288 |
| 9,155,527 B2 * | 10/2015 | Vetter | ................... | A61B 10/06 |
| 9,492,187 B2 * | 11/2016 | Ravikumar | ...... | A61B 17/00234 |

(Continued)

*Primary Examiner* — Donnell A Long
(74) *Attorney, Agent, or Firm* — Monarch IP Group, PLLC; April M. Mosby (57) ABSTRACT

A device and method for measuring and dispensing customizable amounts of dried non-flowable material (e.g. tea, herbs, cannabis, etc.) and solid material (e.g. cake yeast and butter) may comprise a tubular housing and an adjustable plunger. The front-end portion of the tubular housing may include a plunger cavity for insertion of the adjustable plunger. The rear-end portion of the tubular housing may include a chamber to capture solid material for measuring. The adjustable plunger may define the depth of the chamber, such that when the length of the plunger is adjusted, the chamber depth is set to a predetermined volume. In operation, the user may place the measuring device, chamber-side down into the solid or non-flowable material to gather the material into the chamber. When the user desires to release the substance, the user can apply pressure on the adjustable plunger to release the same.

9 Claims, 5 Drawing Sheets

(56) References Cited

U.S. PATENT DOCUMENTS

| | | | |
|---|---|---|---|
| 10,413,282 B2* | 9/2019 | Miller | A61B 10/0283 |
| 2009/0321478 A1* | 12/2009 | Juteau | B65D 83/0011 |
| | | | 222/390 |
| 2020/0367726 A1* | 11/2020 | Landey | A61L 31/022 |

* cited by examiner

DEVICE AND METHOD FOR MEASURING AND DISPENSING CUSTOMIZABLE AMOUNTS OF MATERIAL

BACKGROUND

Holistic herbal remedies have been in use since the third millennium BCE. In particular, cannabis has been an herbal remedy for centuries; yet, since the early 20th century, cannabis has been subject to legal restrictions. The cultivation, possession, and use of cannabis are illegal in most countries, including the United States. Only until recently have certain states decriminalized cannabis. Yet, the herb/drug remains illegal federally. Hence, due to the limited research performed as a consequence of prior legal restrictions, there exists limited evidence for how well the herb medically impacts humans. To remedy the lack of evidence, scientists have set out to perform comprehensive tests on the effects of cannabis. In the medical community in particular, most scientists prefer large studies having certain types of controls before drawing decisive conclusions. However, since research to date has not met the medical communities standards, no conclusive evidence exists. Additionally in research and development, scientists are finding that there is a lack of proper methods to measure this herbal remedy. Further, many types of cannabis vary in strength, making it difficult to exactly quantify the necessary dosage for a particular ailment. Moreover, many methods of measurement require excessive touching with the hands that may contaminate the product and strip away some of the naturally occurring chemicals within the product. Therefore, those in the medical profession have had a hard time determining the benefits/effects of cannabis. That is, they have not found a consistent way to measure the efficacy of cannabis for its medicinal properties and its corresponding application.

Similarly, in the culinary arts fields, it is difficult to get an accurate measurement of dry non-flowable and solid materials. For example, it is hard to assess the proper measurement for brewing loose-leaf tea. In particular, depending upon the amount of dry leaf and type of tea used, a user can enhance the final product. For a lighter taste, a user may prefer using the minimal amount of tea possible (approximately 3-4 grams), where an optimal flavor can be achieved. For a stronger taste, a user may use slightly more leaf, but not too much that the outcome is bitter (approximately 5 grams). Although the use of a scale is available, such use may not be convenient and portable. Further, there are certain solid ingredients that cannot be easily measured with accuracy (such as butter, cake yeast, and the like) without excessive touching with the hands. Hence, presently there is no way to measure differing amounts of dried non-flowable and/or solid materials with a singular device consistently, easily, and without excessive handling of the hands.

It is within this context that the embodiments arise.

SUMMARY

Embodiments of a device and method for measuring and dispensing customizable amounts of non-flowable and solid material are provided. It should be appreciated that the present embodiment can be implemented in numerous ways, such as a process, an apparatus, a system, a device, or a method. Several inventive embodiments are described below.

In some embodiments, a portable device for measuring non-flowable and solid materials is provided. The portable device may include a tubular housing having a front-end portion having a plunge cavity and a rear-end portion having a chamber to capture a sample of the material for measuring. The portable device may include an adjustable plunger seated within the plunge cavity, wherein the adjustable plunger may couple to define the depth of the chamber. Accordingly, when the adjustable plunger length is adjusted, the depth of the chamber is adjusted thereby. In operation, when the rear-end portion of the tubular housing is positioned in the material, the chamber fills with a predetermined amount of the material to be the sample that is defined by the depth of the chamber. To release the sample, when the adjustable plunger is pressed towards the tubular housing, the adjustable plunger forces the sample to exit the chamber.

In some embodiments, a second portable device for measuring solid materials is provided. The second device may include tubular housing having a plunge cavity and a chamber, wherein the chamber is defined to capture solid material for measuring. The chamber may be defined by beveled edges of the tubular housing. A gripping arm may be seated within the plunge cavity, wherein the gripping arm can grip a portion of a solid material to fill the chamber for measurement when it is pushed in and out.

In some embodiments, a method for measuring and dispensing customizable amounts of non-flowable and solid material. In an action, the method may include adjusting a chamber dimension of a tubular housing for receiving solid material. The method may further include setting the tubular housing over the solid material, wherein the chamber is filled with the solid material. In another action, the method may include twisting the tubular housing to cut away excess solid material using a beveled edge of the chamber and compress the solid material within the chamber. The method may further include pressing the adjustable plunger down to release the compressed material out of the chamber and depressing the adjustable plunger to return the device to an initial state.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one so skilled in the art without departing from the spirit and scope of the described embodiments.

DETAILED DESCRIPTION

The following embodiments describe a device and method for measuring and dispensing customizable amounts of non-flowable and solid material. It can be appreciated by one skilled in the art, that the embodiments may be practiced without some or all of these specific details. In other instances, well known process operations have not been described in detail in order not to unnecessarily obscure the embodiments.

In some embodiments, a portable device for measuring non-flowable and solid materials is provided. The portable device may include a tubular housing having a front-end portion having a plunge cavity and a rear-end portion having a chamber to capture a sample of the material for measuring. The portable device may include an adjustable plunger seated within the plunge cavity, wherein the adjustable plunger may couple to define the depth of the chamber. Accordingly, when the adjustable plunger length is adjusted, the depth of the chamber is adjusted thereby. In operation, when the rear-end portion of the tubular housing is positioned in the material, the chamber fills with a predetermined amount of the material to be the sample that is defined by the depth of the chamber. To release the sample, when the adjustable plunger is pressed towards the tubular housing, the adjustable plunger forces the sample to exit the chamber. In some embodiments, the portable device may include a gripping arm seated within the plunge cavity in lieu of the adjustable plunger, wherein the gripping arm can grip a portion of a solid material to fill the chamber for measurement when it is pushed in and out.

In some embodiments, the adjustable plunger may include an header post and a shaft, having a first end coupled to the header post and a second end having a recess. A spring may be coupled juxtapose to the shaft in between the header post and the tubular housing to movably engage the tubular housing in and out. A plunger-end portion may be slidably coupled within the recess of the second end of the shaft. In operation, when the header post is rotated clockwise and counter-clockwise, the shaft may rotate and adjust the depth of the plunger-end portion within the chamber, and thereby, adjust the depth of the chamber. When the rear-end portion of the tubular housing is inserted in the solid or non-flowable material, the chamber is filled with the material, such that the material is compressed and held within the chamber. When the header post is pressed, the tubular housing retracts towards the header post, such that the compressed material exits from the chamber. To return to the initial position, when the header post is depressed, the tubular housing contracts back to its original position.

Advantageously, the portable device disclosed herein can enable the user to measure and compressed specific predetermined amounts for use in both culinary and medical purposes. In this way, an adjustable device for easily measuring and discharging consistent micro portions can be provided. This eliminates the uncertainty among within the medical industry regarding testing, researching, and prescribing the effects of cannabis, which enables the general public to have access and the ability to take advantage of the benefits of the drug. Further, the user does not have to touch the solid or non-flowable material in order to measure and sample the non-flowable or solid material. In this way the efficacy of the non-flowable or solid material is not contaminated, weakened, or otherwise modified, enabling the user to possess the full benefits of the material.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment. Like reference numbers signify like elements throughout the description of the figures.

Figure 1:
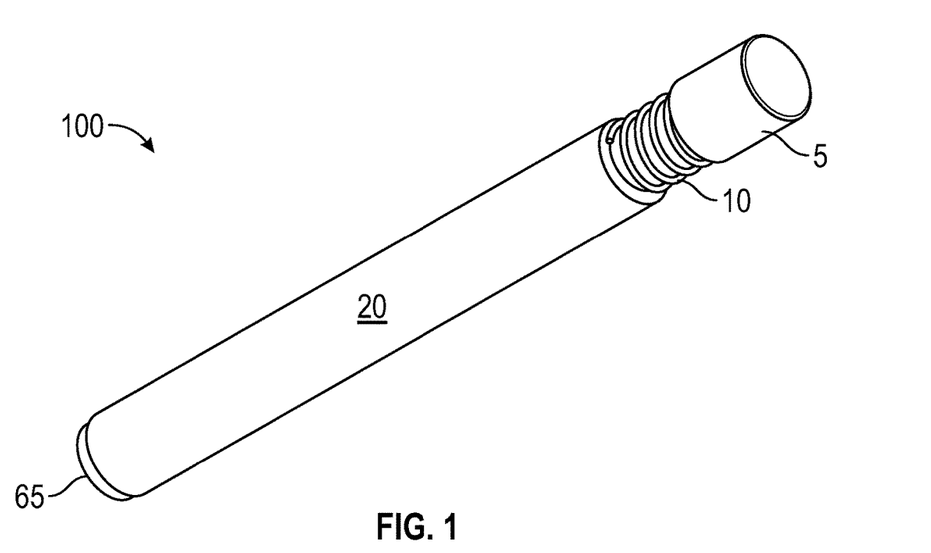
FIG. 1 is a perspective view of a device for measuring and dispensing customizable amounts of dried, non-flowable and/or solid material, in accordance with some embodiments.

Referring to FIG. 1, an exemplary embodiment of a device for measuring and dispensing customizable amounts of dried non-flowable and solid material is shown. The measuring device 100 may include a tubular housing 20, a spring 10, and an adjustable plunger 25. The tubular housing 20 may include a bevel edge 65. The adjustable plunger 25 may slidably couple within the tubular housing 20, wherein the spring 10 couples juxtapose to the tubular housing 20 and a header post 5 of the adjustable plunger 25. In some embodiments, the portable device 100 may include a gripping arm (not shown) seated within the plunge cavity in lieu of the adjustable plunger 25, wherein the gripping arm can grip a portion of a solid material to fill the chamber for measurement when it is pushed in and out.

In some embodiments, the cross-section of the housing 20 may be may be any shape selected from the group comprising: cylindrical, rectangular, hexagonal, orthogonal, and the like. The size of the housing 20 may also differ, such that the chamber region defined within it aligns with a range volumes. For example, when the measuring device 100 is manufactured for culinary purposes such as measuring tea, butter, and/or yeast, the chamber may include a specific volume corresponding to culinary measurements of a teaspoon, tablespoon, cup, and the like. In the alternative, the volume may align with a specific measure of grams for loose tea preparation, such as 3-5 grams. In some embodiments, each component of the measuring device may be constructed from one or more non-flexible and/or flexible materials, such as a metal, wood, synthetic rubber, plastic, or the like.

Figure 2A:
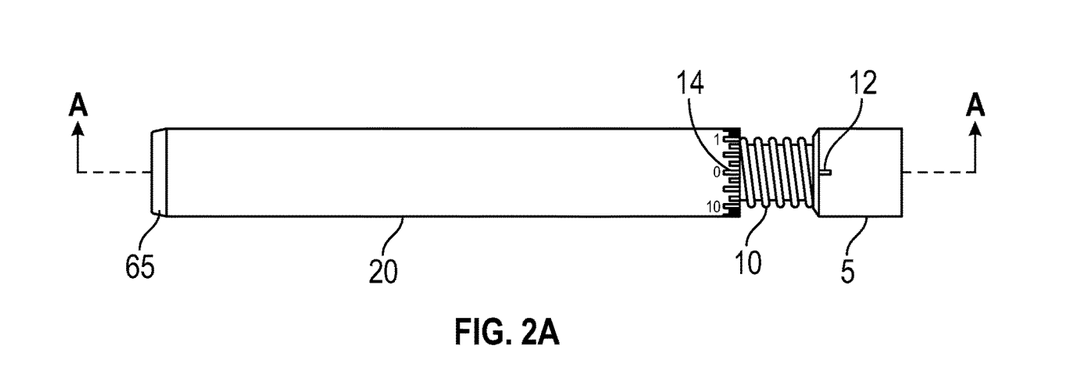
FIG. 2A is a top view of the device of FIG. 1 during the adjusting stage, when the header post is rotated clockwise and counter-clockwise, adjusting the depth of the chamber in some embodiments.
Figure 2B:
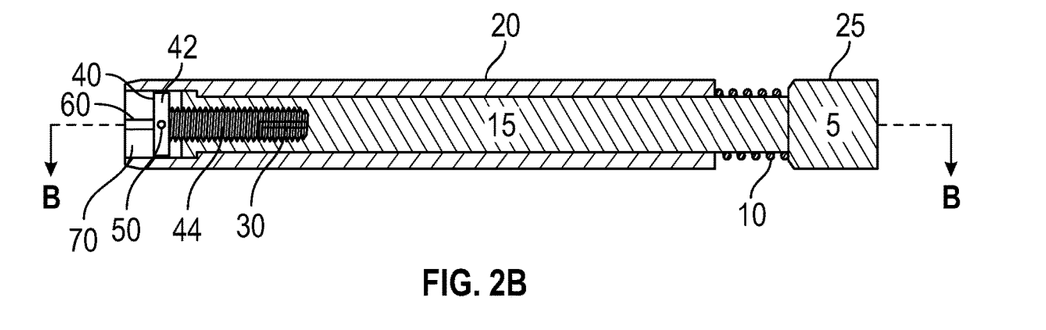
FIG. 2B is a cross-sectional view of the device of FIG. 1 along A-A in some embodiments.
Figure 3B:
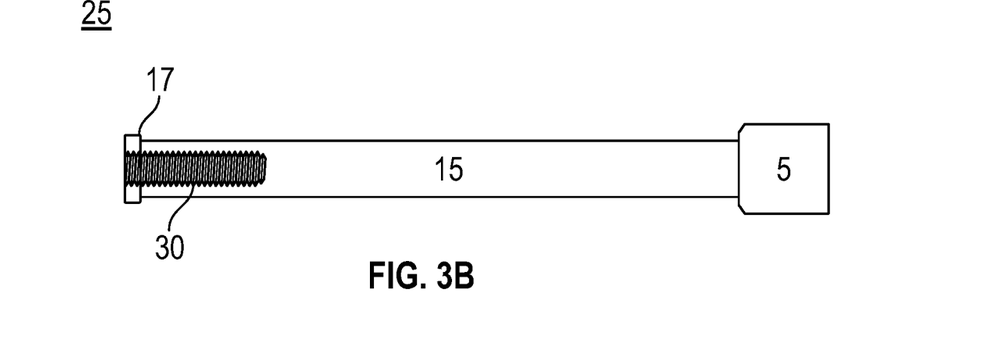
FIG. 3B is a top view of the adjustable plunger for the measuring device of FIG. 1 in some embodiments.
Figure 4A:
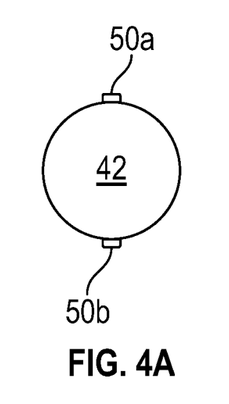
FIG. 4A is a top view of the plunger header-portion for the measuring device of FIG. 1 in some embodiments.
Figure 4B:
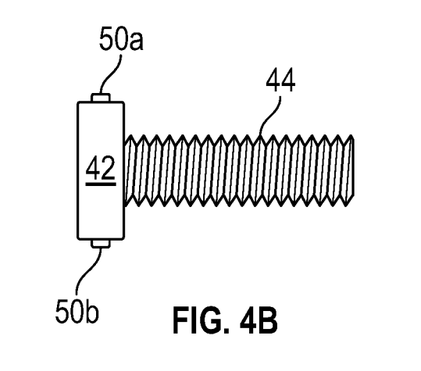
FIG. 4B is a top view of the plunger header-portion for the measuring device of FIG. 1 in some embodiments.
Figure 4C:
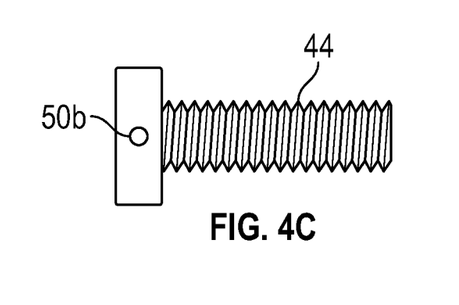
FIG. 4C is a side view of the plunger header-portion for the measuring device of FIG. 1 in some embodiments.

Referring to FIG. 2A, the top view of the device of FIG. 1 during the adjusting stage shows that when the header post is rotated clockwise and counter-clockwise, the depth of the chamber is adjusted in some embodiments. As shown in FIG. 2A, the tubular housing 20 may include predetermined measurement markings 14 that align with measurement settings 12 on the header post 5. Referring to FIG. 2B, a cross-sectional view of the device of FIG. 1 along A-A in some embodiments is shown. As shown, the adjustable plunger 25 may include the header post 5, a shaft 15, a spring 10, and a plunger-end portion 40. As shown in FIGS. 2B and 3B, the adjustable plunger 25 may comprise the header post 5 coupled to the shaft 15 having a recess 30 with female threads as shown in FIG. 2B. The plunger-end portion 40 may couple into the shaft 15 at the recess opening. The plunger-end portion 40 may include a base 44, having male threads, that couples to a head 42 having one or more protrusions (50a, 50b) that slidably couple into a groove 60 of tubular housing 20 (as shown in FIGS. 2B and 4A-C). More particularly, FIGS. 4A-C illustrate the top, first, and second side views of the plunger header-portion for the measuring device of FIG. 1 in some embodiments.

In some embodiments, the cross-section of the shaft 15 may be selected from the group comprising: cylindrical, rectangular, hexagonal, orthogonal, and the like. Similarly, the cross-section of the head 42 may be selected from the group comprising: cylindrical, rectangular, hexagonal, orthogonal, and the like. The length of the shaft 15 may also differ in accordance with the size of the chamber formed within the housing 20.

Figure 2C:
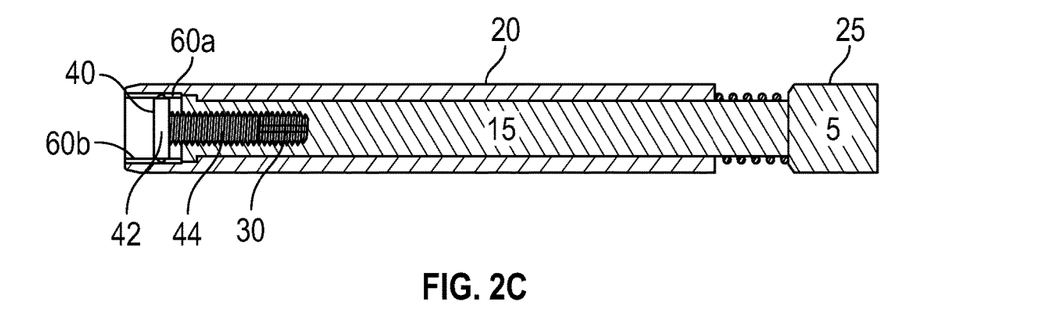
FIG. 2C is a cross-sectional view of the device of FIG. 1 along B-B in some embodiments.

Referring now to FIG. 2C, a cross-sectional view of the device of FIG. 1 along B-B in some embodiments is shown. In particular, as shown where the cross-sectional view along the B-B cutline is shown, one of the more grooves (60a,60b) in the tubular housing chamber 70 hold the protrusions (50a,50b) of the head, such that when the plunger-end portion 40 is adjusted the head 42 slides along the grooves (60a,60b). In some embodiments, the protrusions (50a,50b) may be rectangular as shown. In other embodiments the protrusions (50a,50b) may align with the size and shape of the grooves (60a,60b), which may have a cross-section that can be selected from the group of cylindrical, rectangular, hexagonal, orthogonal, and the like.

Figure 3A:
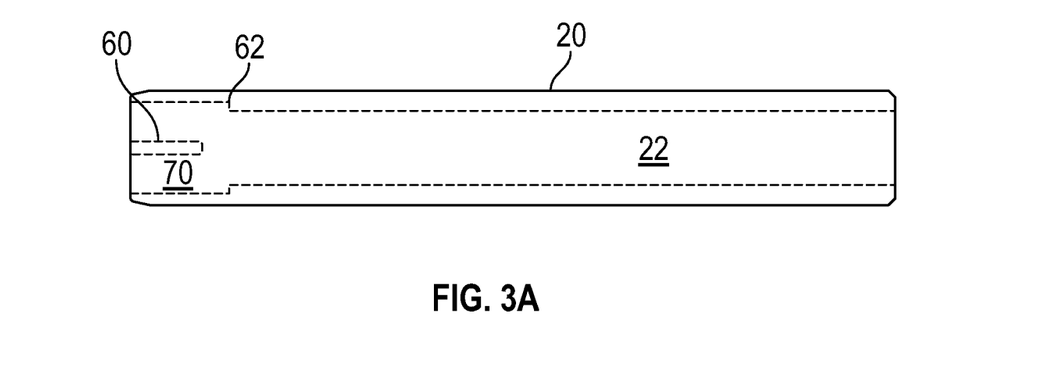
FIG. 3A is a top view of the tubular housing for the measuring device of FIG. 1 in some embodiments.

Referring to FIG. 3A, the top view of the tubular housing for the measuring device of FIG. 1 in some embodiments is displayed. As shown, the plunger cavity 22 of the tubular housing 20 may include a chamber ledge 62 that defines and how far the lip 17 of adjustable plunger 25 can extend. Referring to FIG. 3B, the top view of the adjustable plunger for the measuring device of FIG. 1 in some embodiments is shown. In particular, the adjustable plunger 25 may comprise the header post 5 coupled to the shaft 15 having a recess 30 with female threads. A lip 17 of the plunger 25 acts as an end point for the stopping the plunger from sliding completely outside of the housing 20.

In some embodiments, the tubular housing 20 may include a relief pattern (not shown) cut into its exterior surface for non-slip gripping of the device. In the alternative, a silicone sleeve (not shown) may be included to be framed around the body of the device 100 for a non-slip grip of the device 100. Further, the silicone sleeve may contain a pocket having a groove and a latch for holding tools to assist in the action of dosing: poker, hemp wick, brush, and the like. In some embodiments, the tubular housing 20 and chamber 70 may measure small micro amounts of non-flowable materials. In other embodiments, the tubular housing 20 and chamber 70 may measure moderate amounts of solid materials (such as butter, yeast, and the like).

Figure 5A:
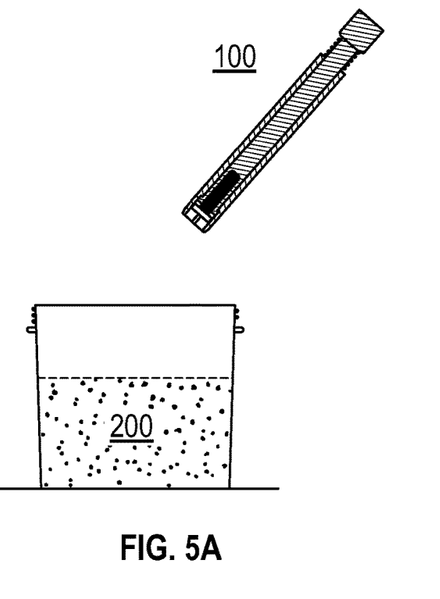
FIG. 5A-5B is a cross-sectional view of the device of FIG. 1 in the extraction state, when the device is pressed downward in a non-flowable or solid material in some embodiments.

In operation, the measuring device has four states: a resting state, an adjusting state, an extraction state, and an expulsion state. When in the resting state as shown in FIG. 5A, the plunging mechanism is urged rearward at all times by a means of the return spring. The adjusting state can be effected by turning the header post 5 clockwise and counter-clockwise to slidably engage the plunger-end portion 40 to be further inserted into the recess 30 of the shaft 15 and/or further retracted out of the shaft 15 (as shown in FIGS. 2A and 2B). That is, the male threads of the plunger-end portion 40 can be slidably adjusted along the grooves of the female threads of the shaft 15, adjusting the position of the head 42 that defines the depth of the chamber 70 within the tubular housing 20. Thereby, the chamber dimension accessible to the non-flowable and solid material can be either increased or decrease, changing the measurements to a predetermined amount with the turning of the header post 5 either in a clockwise or counter-clockwise.

Figure 5B:
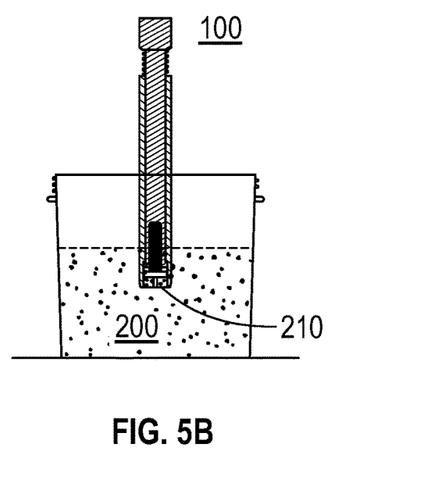

The extraction state is illustrated in FIGS. 5A-5B, which display the cross-sectional view of the device of FIG. 1, where the device is positioned downward in a non-flowable or solid material according to some embodiments. In particular, when the user positions the rear-end portion of the tubular housing 20 in the material 200, the chamber 70 fills with a predetermined amount of the material to be the sample 210 which is defined by the depth of the chamber 70. In particular, the extraction state can be effected by inserting the tubular housing 20 of the measuring device 100 within a pile of the solid or non-flowable material, such as butter, yeast, herbs, spices, tea leaves, and the like. As such, the solid and/or non-flowable material 200 can slide snuggly within the chamber 70 of the tubular housing 20 without the aid of the user's hands. Accordingly, a sample 210 of the solid material 200 can be packed and held in place within the chamber 70.

Figure 5C:
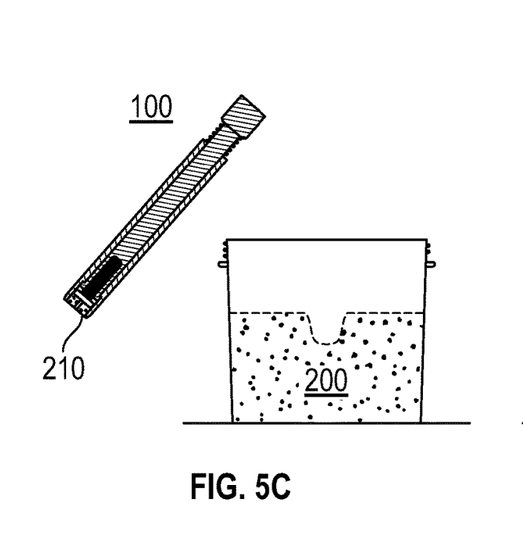
FIG. 5C-5D is a cross-sectional view of the device of FIG. 1 in the expulsion state, when the header post of the adjustable plunger is pressed downward dispensing the compressed solid in some embodiments.
Figure 5D:
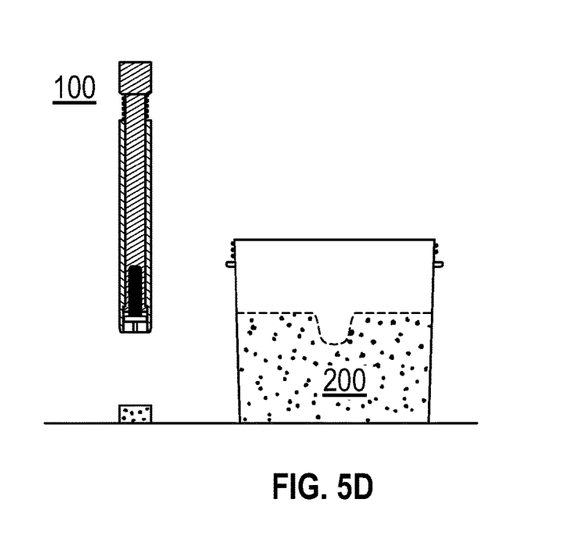

In the expulsion state as shown in FIGS. 5C-5D, the cross-sectional view of the device of FIG. 1 demonstrates that when the header post 5 of the adjustable plunger 25 is pressed downward, the compressed solid can be dispensed. The expulsion state can be effected by holding the device upright in a vertical position and pushing the header post in a downward motion towards the tubular housing, wherein the tightly packed solid material can be released from the chamber onto a table, within a container and/or the like.

Figure 6A:
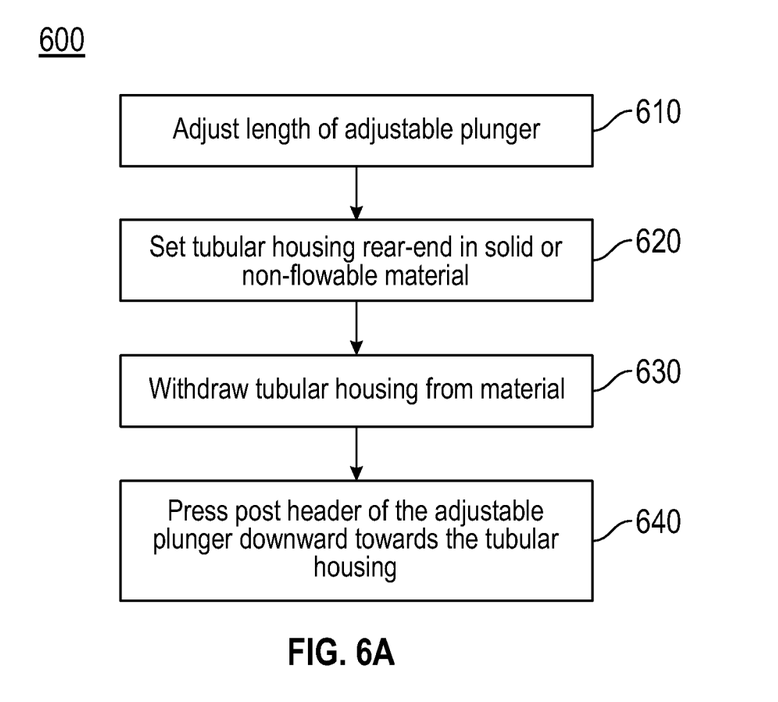
FIG. 6 is a flow diagram of a method measuring and dispensing customizable amounts of solid material, in accordance with some embodiments.
Figure 6B:
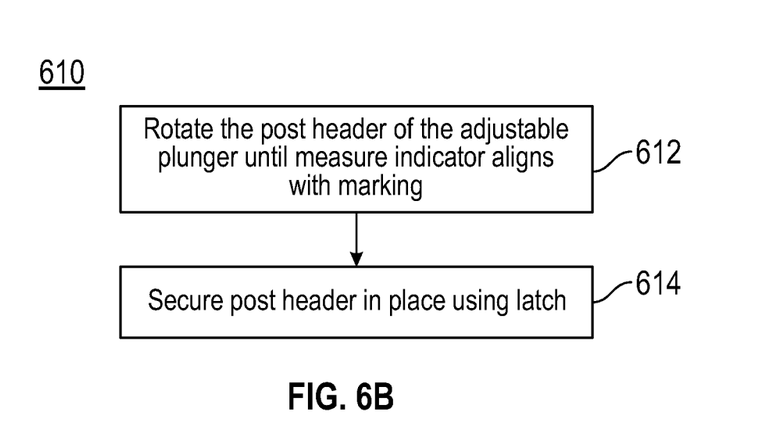

Referring now to FIG. 6, a flow diagram of a method measuring and dispensing customizable amounts of non-flowable and solid material, in accordance with some embodiments. In an action 610, the user may adjust the length of the adjustable plunger. For example, as shown in FIG. 2A, which represents a top view of the device of FIG. 1 during the adjustment stage, when the header post is rotated clockwise and counter-clockwise, the depth of the chamber may be adjusted to a predetermined setting in some embodiments. In another action 620, the user may set the tubular housing rear-end in the solid or non-flowable material. For example, as shown in FIGS. 5A-5B, which represents the cross-sectional view of the device of FIG. 1 in the extraction state, when the device is positioned downward in a non-flowable or solid material a sample of the material may be collected. The user may withdraw the tubular housing from the material in an action 630. Further, in an action 640, the user may press the post header of the adjustable plunger downwards towards the tubular housing. For example, as shown in FIGS. 5C-5D, which represents the cross-sectional view of the device of FIG. 1 in the expulsion state, when the header post 5 of the adjustable plunger 25 is pressed downward, the compressed solid may be dispensed in some embodiments. Further, due to the spring of the adjustable plunger, when the user releases the header post in an additional action (not shown), the adjustable plunger can retract back to its original position ready to measure and sample the next portion of material.

In operation during the adjustment stage in an action 612, the header post may be rotated until the measure indicator aligns with the marking. For example, as shown in FIG. 2A, which represents a top view of the device of FIG. 1 during the adjustment stage, when the header post is rotated clockwise and counter-clockwise, the depth of the chamber may be adjusted to a predetermined setting in some embodiments. In an action 614, the header post may be secured in place using a latch (not shown) and/or haptic feedback.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "I" symbol includes any and all combinations of one or more of the associated listed items. As used herein, the singular forms "a", "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A portable device for measuring a sample of solid and non-flowable material, the portable device comprising:
   a tubular housing having a front-end portion and a rear-end portion, the front-end portion having a plunge cavity, the rear-end portion having a chamber to capture the sample for measuring; and
   an adjustable plunger seated within the plunge cavity, the adjustable plunger coupled to define the depth of the chamber, wherein when the adjustable plunger length is adjusted, the depth of the chamber is adjusted thereby;
   wherein when the rear-end portion of the tubular housing is positioned in the material external to the tubular housing, the chamber fills with a predetermined amount of the material to be the sample defined by the depth of the chamber, and wherein when the adjustable plunger is pressed towards the tubular housing, the adjustable plunger forces the sample to exit the chamber.

2. The portable device of claim 1, wherein the adjustable plunger comprises:
   a header post;
   a shaft, having a first end and a second end, the first end coupled to the header post, the second end having a recess;
   a spring coupled juxtapose to the shaft in between the header post and the tubular housing to movably engage the tubular housing in and out; and
   a plunger-end portion slidably coupled within the recess of the second end of the shaft;
   wherein, when the header post is rotated clockwise and counter-clockwise, the shaft rotates and adjusts the depth of the plunger-end portion within the chamber and thereby adjusts the depth of the chamber an adjustable plunger seated within the plunge cavity, the adjustable plunger coupled to define the depth of the chamber, wherein when the adjustable plunger length is adjusted, the depth of the chamber is adjusted thereby;
   wherein, when a rear-end portion of the tubular housing is inserted in the solid material, the chamber is filled with the material, such that the solid material is compressed and held within the chamber, and when the header post is pressed, the tubular housing retracts towards the header post, such that the compressed material exits from the chamber, wherein when the header post is depressed, the tubular housing contracts.

3. The portable device of claim 2, wherein the plunger-end portion comprises:
   a base having male threads, wherein the base portion slidably couples within the recess of the shaft, the recess having female threading; and
   a head coupled to the base, wherein the head defines the depth of the chamber.

4. The portable device of claim 3, wherein the head comprises:
   a disc; and
   one or more protrusions coupled to the disc.

5. The portable device of claim 4, wherein the chamber comprises:
   one or more grooves;
   wherein the one or more protrusions of the head slidably sit within the one or more grooves.

6. The portable device of claim 1, wherein the rear-end portion of the tubular housing having beveled edges for cutting excess solid material.

7. The portable device of claim 1, wherein the tubular housing is made of a material selected from the group consisting of metals, plastics, rubbers, elastomers and other synthetic resins;
   a base having male threads, wherein the base portion slidably couples within the recess of the shaft, the recess having female threading; and
   a head coupled to the base, wherein the head defines the depth of the chamber.

8. The portable device of claim 1, wherein the adjustable plunger is made of a material selected from the group consisting of metals, plastics, rubbers, elastomers and other synthetic resins.

9. A portable device for measuring solid materials, the portable device comprising:
   a cylinder barrel having a plunge cavity and a chamber defined by beveled edges for cutting excess solid material;
   a shaft, having a recess, slidably placed within the plunge cavity, wherein the recess having female threads;
   a header post coupled to the shaft;
   a spring coupled juxtapose to the shaft between the header post and the cylinder barrel to movably engage the shaft in and out; and
   an adjustable plunge mechanism having a base with male threads coupled to a head, wherein the base slidably couples within the recess of the shaft, and wherein the head defines the chamber for holding the solid material, whereby when the header post is turned clockwise and counter-clockwise the shaft rotates and adjusts the depth of the head within the chamber, thereby defining the depth of the chamber for measurement of solid material;
   wherein when the cylinder barrel is positioned within material external to the cylinder barrel, the chamber is filled with a sample of the material and wherein when the header post is pressed towards the cylinder barrel, the shaft forces the sample to exit the chamber.

* * * * *